United States Patent [19]

Charng

[11] Patent Number: 6,000,093
[45] Date of Patent: Dec. 14, 1999

[54] WIPER BLADE ASSEMBLY

[76] Inventor: Cedric S. K. Charng, 3F-1, Lane 56, Wan An St., Moozar Taipei, Taiwan

[21] Appl. No.: 09/038,829

[22] Filed: Mar. 12, 1998

[51] Int. Cl.⁶ ........................................................ B60S 1/38
[52] U.S. Cl. .................................. 15/250.201; 15/250.44; 15/250.32; 15/250.452
[58] Field of Search ...................... 15/250.201, 250.451, 15/250.452, 250.453, 250.454, 250.44, 250.32, 250.361; 403/321, 322, 24, 154, 101

[56] References Cited

U.S. PATENT DOCUMENTS

| | | | |
|---|---|---|---|
| 3,083,394 | 4/1963 | Scinta | 15/250.454 |
| 3,320,628 | 5/1967 | Bacher et al. | 15/250.201 |
| 3,899,800 | 8/1975 | Wittwer et al. | 15/250.44 |
| 4,457,041 | 7/1984 | Kimber et al. | 15/250.452 |
| 4,649,591 | 3/1987 | Guerard | 15/250.32 |
| 4,670,934 | 6/1987 | Epple et al. | 15/250.32 |
| 4,683,606 | 8/1987 | Sharp | 15/250.452 |
| 5,311,636 | 5/1994 | Lee | 15/250.201 |
| 5,332,328 | 7/1994 | Yang | 15/250.32 |
| 5,454,135 | 10/1995 | Okuya et al. | 15/250.201 |
| 5,493,750 | 2/1996 | Bollen et al. | 15/250.452 |
| 5,611,103 | 3/1997 | Lee | 15/250.32 |
| 5,613,266 | 3/1997 | Lee | 15/250.201 |
| 5,617,607 | 4/1997 | Chen | 15/250.201 |
| 5,632,059 | 5/1997 | Lee | 15/250.32 |

FOREIGN PATENT DOCUMENTS

| | | |
|---|---|---|
| 0565067 | 10/1993 | European Pat. Off. . |
| 0728641 | 9/1996 | European Pat. Off. . |
| 2605272 | 4/1988 | France ................................ 15/250.453 |
| 1202649 | 8/1970 | United Kingdom . |
| 2180144 | 3/1987 | United Kingdom . |
| 2190834 | 12/1987 | United Kingdom .............. 15/250.201 |
| 2191936 | 12/1987 | United Kingdom . |
| 2193432 | 2/1988 | United Kingdom . |

*Primary Examiner*—Gary K. Graham

[57] ABSTRACT

The invention seeks to provide an improved wiper blade assembly, and in a broad aspect provides a windscreen wiper blade assembly comprising at least a primary yoke and a pair of secondary yokes articulated thereto, the primary yoke and/or the secondary yokes being provided with at least one wind-deflecting surface, oriented in relation to the direction of motion of the vehicle so that when said vehicle is moving to create air flow over the windscreen, air is deflected by said surface or surfaces to produce a force tending to urge the wiper blade assembly towards the windscreen of the vehicle. And end cap is provided for accommodating the ends of the secondary yokes and the of the backing member and wiper blade rubber. A connector disposed within the primary yoke accommodates different size diameter pins of different sized wiper arms.

2 Claims, 7 Drawing Sheets

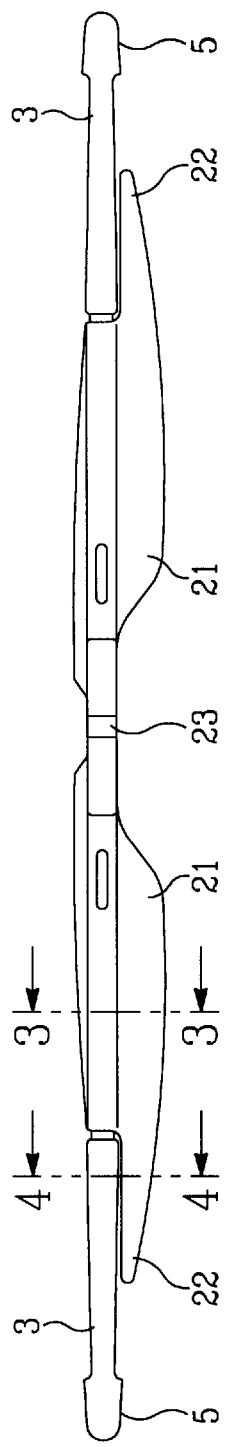
Fig. 1
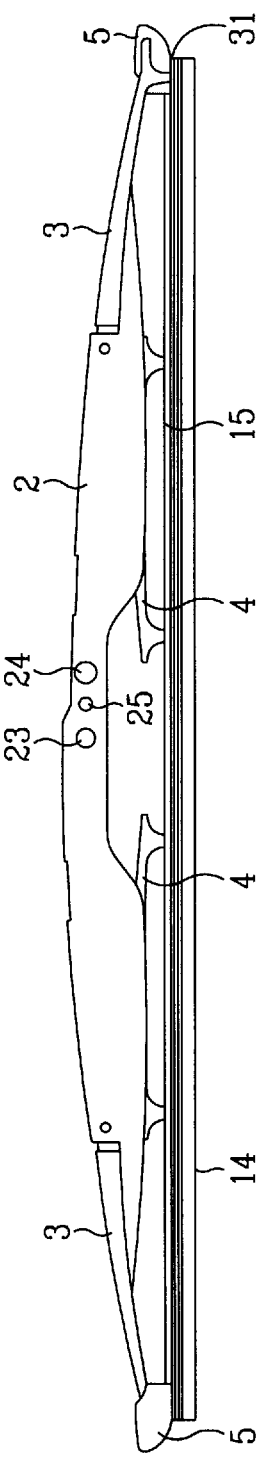
Fig. 2
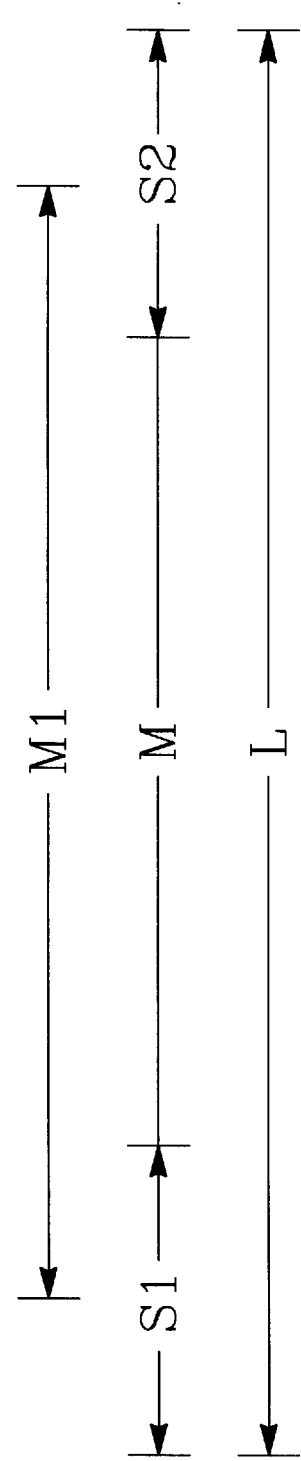

WIPER BLADE ASSEMBLY

BACKGROUND OF THE INVENTION

1. Field of the Invention

The present invention relates to a wiper blade assembly, particularly of the type used for mounting windscreen wipers on motor vehicles.

2. Description of the Prior Art

A conventional wiper blade assembly comprises a primary yoke for attachment to a wiper arm and two secondary yokes pivotally attached to opposite ends of the primary yoke. In the case of a dual wiper blade assembly, two side-by-side secondary yokes may optionally be attached to each end of the primary yoke. A separate tertiary yoke is articulated to one, usually the outermost one, of the two free ends of each secondary yoke. Claws for mounting a single wipe blade or dual, parallel wiper blades are provided at the ends of the tertiary yokes not occupied by the tertiary yokes. There is thus provided a flexible six point mounting for the or each wiper blade, which affords a reasonable degree of contact between the wiper blade and the windscreen, at least in calm conditions when the vehicle is travelling slowly.

A problem arises with such a wiper blade assembly, however, when the vehicle is travelling forwards, particularly at high speed. The upward air flow over the windscreen tends to lift the wiper blade assembly away from the windscreen particularly on its downward stroke. To alleviate this problem, spoilers or wind deflecting vanes have been proposed for the leading edge of the assembly. However, the attachment of such spoilers to the primary yoke complicates the manufacture of the assembly.

SUMMARY OF THE INVENTION

The present invention provides a windscreen wiper blade assembly comprising at least a primary yoke and a pair of secondary yokes articulated thereto, the primary yoke being formed integrally with at least one wind deflecting member which extends away from the center of the primary yoke, parallel and adjacent to at least a portion of one of the secondary yokes, the wind deflecting member(s) being oriented so as to deflect air flowing over the windscreen as a result of the vehicle's motion and to produce a force tending to urge the wiper blade assembly towards the windscreen.

Preferably, the primary yoke has two wind deflecting members, each of which extends parallel and adjacent to a portion of one of the secondary yokes. In a preferred embodiment, the wind deflecting member(s) form(s) together with the primary and secondary yokes, surfaces which slope downwardly towards the windscreen of the vehicle.

The wiper blade may be provided with retaining elements such as caps at opposite ends, each retaining element housing an end of a blade rubber, an end of a blade backing member and an end of an outermost yoke (which may be a secondary or tertiary yoke). Such a retaining element can secure the three retained components together, improve the appearance of the assembly and cover potentially dangerous sharp edges of the blade and backing member.

In a particular embodiment of the invention, the assembly is provided with a connector for connecting to a wiper arm, the connector comprising means for retaining the connector on the primary yoke and different engaging means for engaging different shapes and/or sizes of wiper arm.

The retaining means may comprise means for snap-fitting the connector to the primary yoke. The engaging means may comprise a seating surface for engaging a hook type wiper arm, and/or differently sized passages for engaging with pin type wiper arms of different sizes, with an optional latching member.

The present invention will now be described in more detail, by way of example only, with reference to the accompanying drawings.

BRIEF DESCRIPTION OF THE DRAWINGS

FIG. 1 is a plan view of a wiper blade assembly according to an embodiment of the invention;

FIG. 2 is a side view of the assembly shown in FIG. 1;

DETAILED DESCRIPTION OF THE PREFERRED EMBODIMENTS

Figure 3:
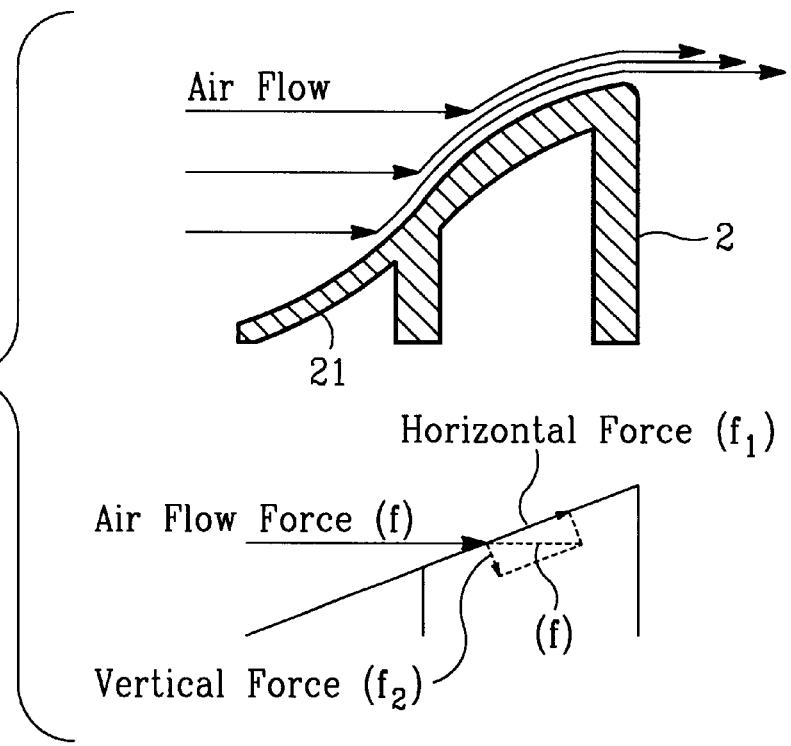
FIGS. 3 and 4 are sections taken along lines III—III and IV—IV respectively of FIG. 1.

FIGS. 1 and 2 show a wiper blade assembly comprising a primary yoke 2 having two secondary yokes 3 articulated to its ends. Tertiary yokes 4 are articulated to the inner ends of the secondary yokes 3. The ends of the tertiary yokes have claws for mounting an elongated blade backing member 15, and the outer ends of the secondary yokes have claws 31 for this same purpose.

The primary yoke 2 is formed integrally with two wind deflecting members 21 which extend outwardly, downwardly towards the windscreen and beyond the mountings of the secondary yokes 3, running parallel and adjacent to the secondary yokes.

Referring to the dimensions shown in FIG. 2, M1 is the length of the primary yoke 2 including its integral wind deflecting members 21, M is the distance between the mountings of the secondary yokes (and in a typical prior art wiper blade assembly, M is also the length of the primary yoke). 51 and 52 are the lengths of the portions of the secondary yokes 3 extending beyond their mountings and L is the total length of the assembly. It will be seen that M1>M and hence M1+S1+S2>L. By contrast, in the prior art assembly, M+S1+S2=L.

Figure 4:
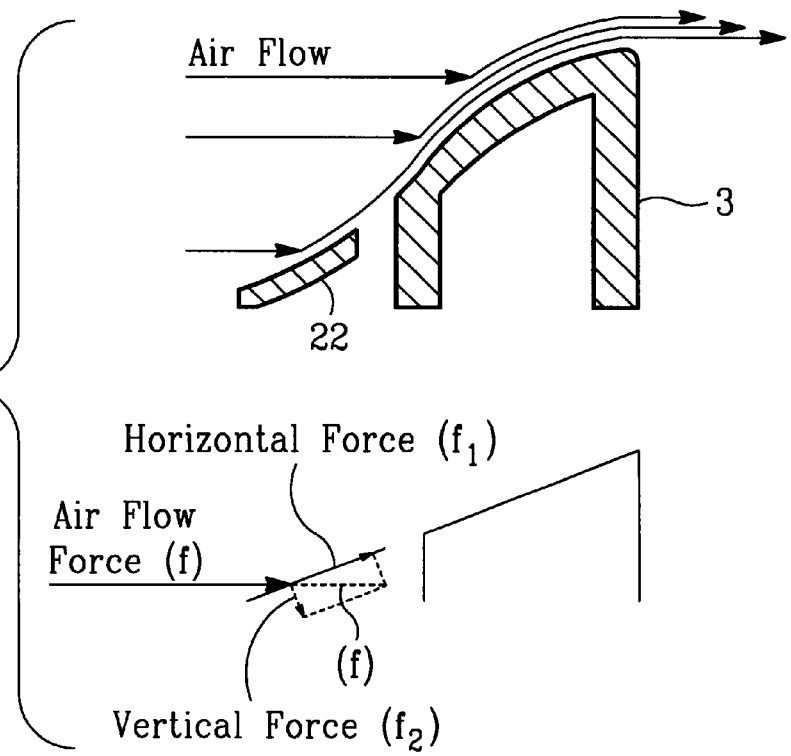
Figure 5:
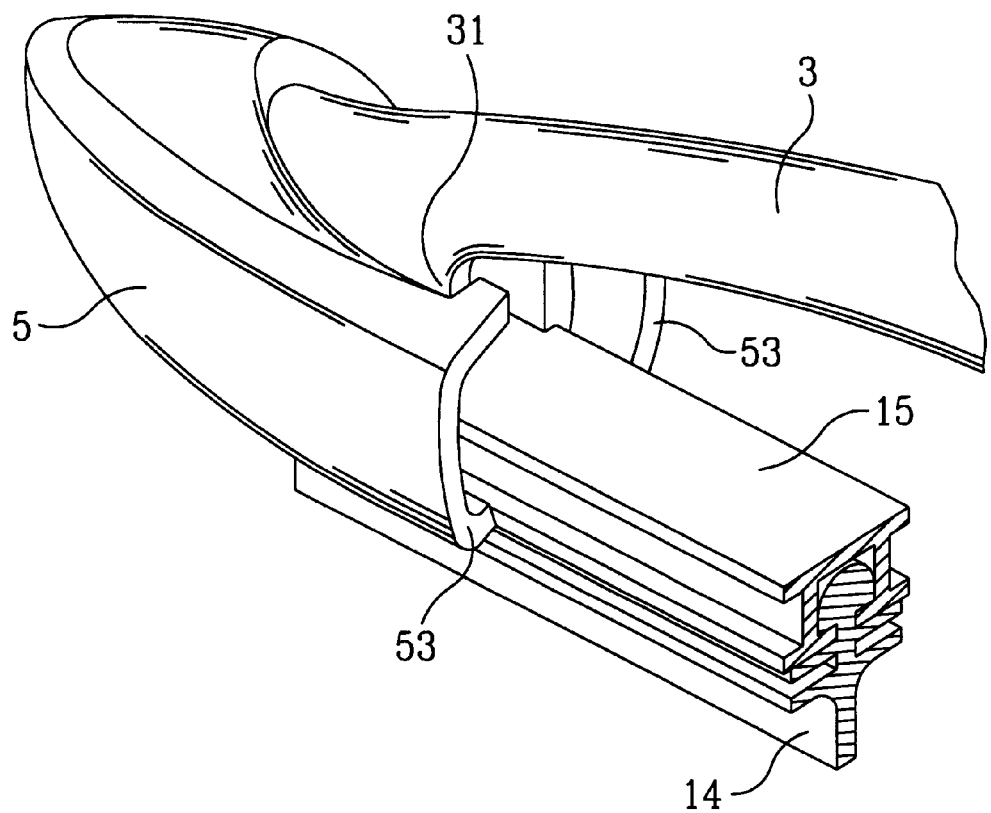
FIG. 5 is a fragmentary perspective view showing an end cap.
Figure 8:
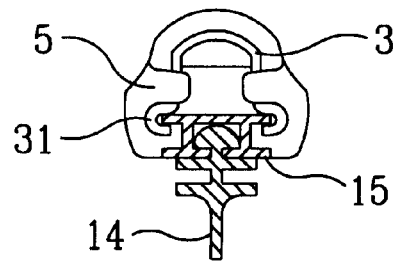
FIGS. 8, 9 and 10 are transverse sections taken along lines VIII—VIII and IX—IX of FIG. 6 and line X—X of FIG. 7 respectively.
Figure 9:
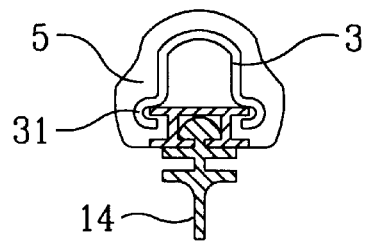
Figure 10:
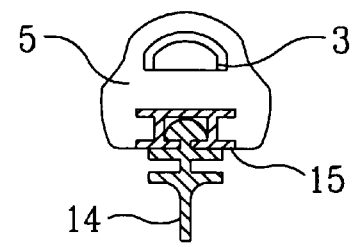

As shown in FIG. 3, the surface presented to the flowing air by the wind deflecting member 21 and primary yoke 2 slopes continuously downwards and the airflows impinging thereon create a tangential force f1 and a normal force f2. The normal force f2 causes the wiper blade rubber 14 to conform more precisely to the shape of the windscreen during both the upward and downward stroke of the assembly. In addition, the so-called "headwind" and the resultant resistance to motion on the downward stroke are reduced. FIG. 4 shows that the same effects and advantages are achieved by the combination of the outermost portions 22 of the wind deflecting members 21 and the secondary yokes 3. The overall effect is similar to that obtained by attaching a large spoiler to the assembly, but no separate attachment step is required in the manufacture of the assembly because the wind deflecting members 21 are formed integrally with the primary yoke, for example by homogeneously molding from plastic material.

Figure 6:
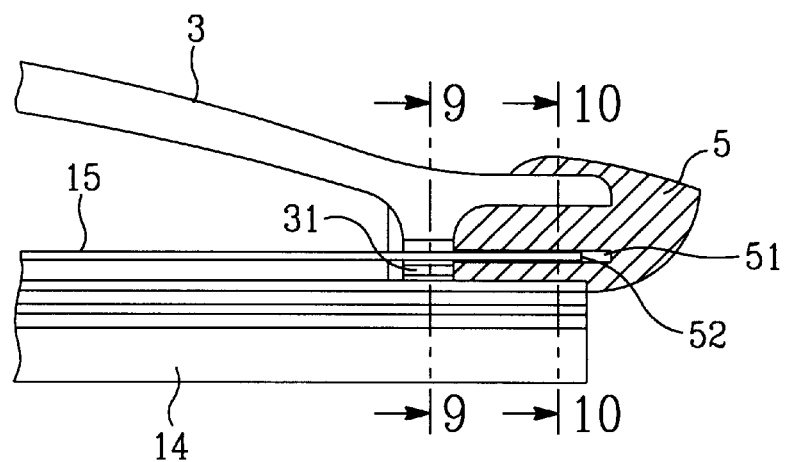
FIGS. 6 and 7 are longitudinal sectional views of the end cap.
Figure 7:
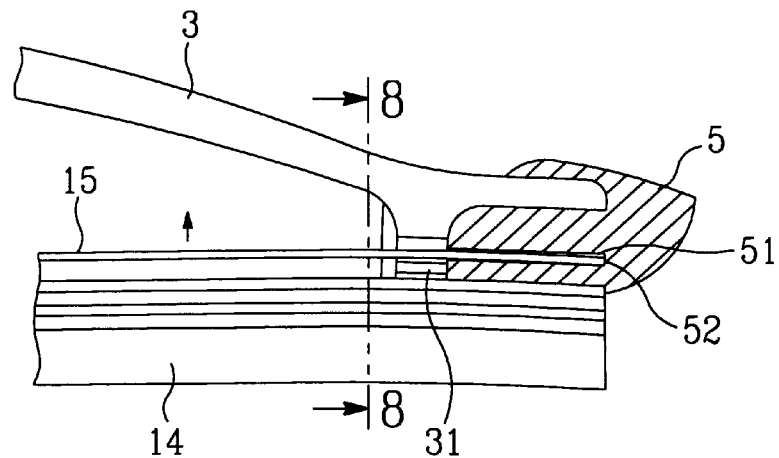

FIGS. 5 to 10 show an end cap 5 for fixing to either end of the wiper blade assembly. The end cap 5 has a slot accommodating the end of the secondary yoke, a further slot 51 accommodating the end 52 of the backing member 15 and a channel in which the end of the wiper blade rubber 14 comes to rest. Inner portions 53 of the end cap extend around the secondary yoke claws 31. In this manner the end cap retains all of the secondary yoke 3, backing member 15 and rubber 14 together. However, the wiper blade assembly is still permitted to flex as it moves over the windscreen. FIG. 6 shows the backing member 15 and rubber 14 in a straight position, whilst FIG. 7 shows these components in a flexed position, in which the backing member end 51 extends further into its slot 52.

Figure 11:
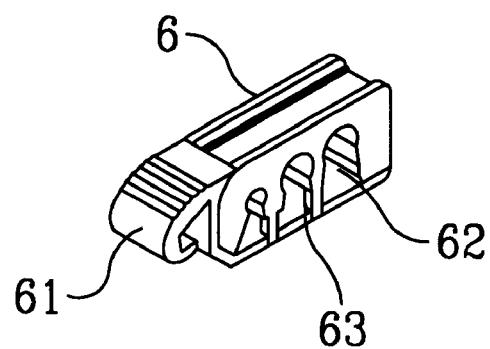
FIG. 11 is a perspective view of a connector.

FIG. 11 shows a connector 6, which can be snap-fitted to a rod 23 forming part of the primary yoke 2 and which is used to connect the wiper blade assembly to one of a number of different kinds of wiper arm. The connector 6 has keyhole-shaped passages 62, 63, a latching member 61 which is hinged to an end of the connector, and a peripheral channel 64 running around the connector. When the connector is fitted to the primary yoke 2, the differently-sized passages 62, 63 align with differently sized holes 64, 65 in the side walls of the primary yoke.

Figure 12:
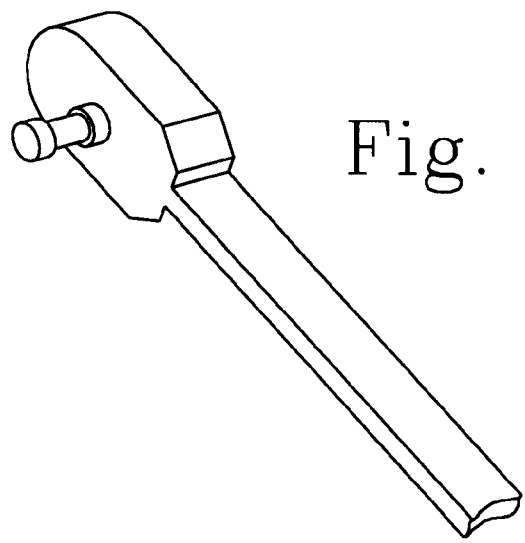
FIG. 12 is a perspective view of the end of a pin type wiper arm.
Figure 13:
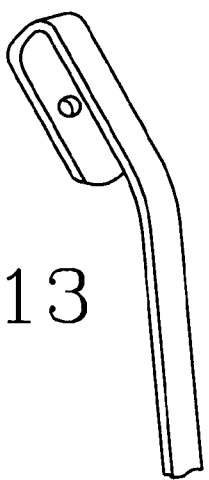
FIG. 13 is a perspective view of the end of a hook type wiper arm.

FIG. 12 shows a pin type wiper arm having a head carrying a pin with an enlarged end. FIG. 13 shows a hook type wiper arm, the hooked end being formed from a curved planar portion.

Figure 14:
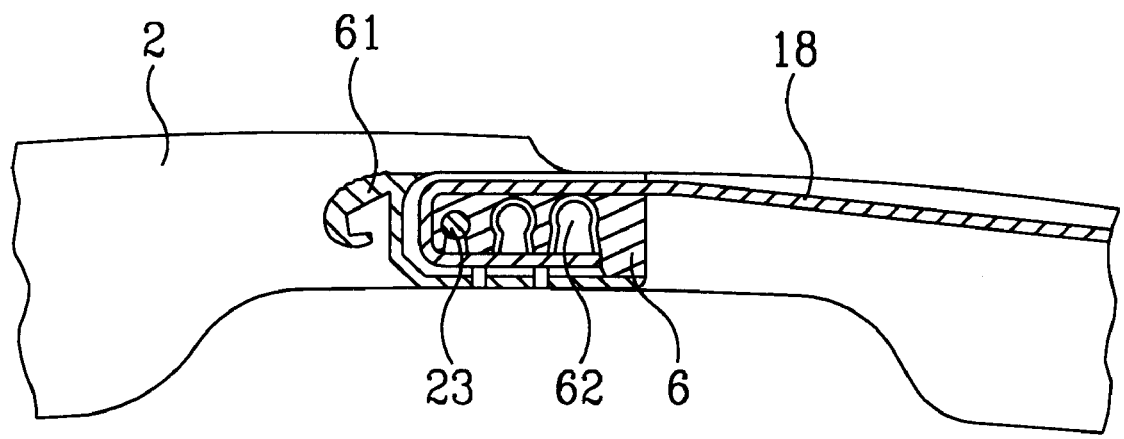
FIG. 14 is a sectional view showing the connector of FIG. 11 engaged with the hook type wiper arm.

FIG. 14 shows the connector 6 in place within the primary yoke 2. The hooked end of a hook type wiper arm has been engaged in the channel 64 and the latching member 61 has been closed around the lower and end regions of the channel. Thus the wiper blade assembly is securely connected to the arm.

Figure 15:
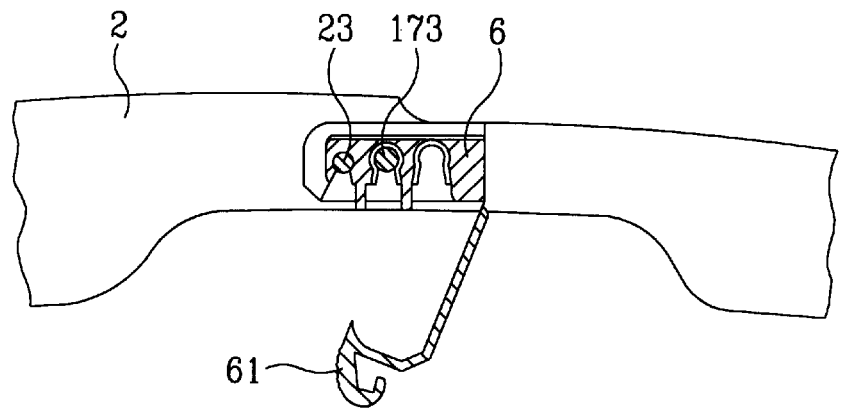
FIGS. 15, 16 and 17 are sectional views showing how the connector of FIG. 11 can be engaged with different pin type wiper arms.
Figure 16:
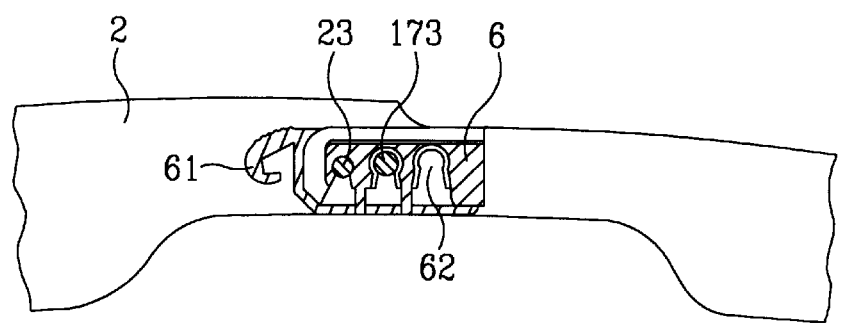

FIG. 15 shows the connector 6 in place within the primary yoke 2 with the latching member 61 open. A small pin 173 of a pin type wiper arm has been inserted through the smaller hole 25 of the primary yoke and lodged in the smaller keyhole-shaped passage 63, which is aligned with the smaller hole 25. The latching member 61 can then be closed, to retain the pin 173 more securely, as shown in FIG. 16.

Figure 17:
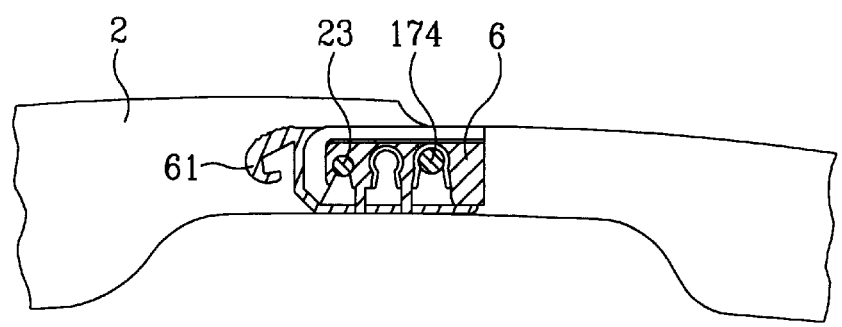

FIG. 17 shows how a larger pin 174 of a different pin type wiper arm can be inserted through the larger primary yoke hole 24 and lodged in the larger keyhole-shaped passage 62.

Whilst the embodiment of the invention which has been described above is a single blade assembly, the invention is equally applicable to dual wiper blade assemblies.

According to another aspect of the invention, there is provided an end cap for a windscreen wiper blade assembly, having recesses for housing an end of a yoke of the assembly, an end of a blade backing member and an end of a blade rubber.

According to yet another aspect of the invention, there is provided a connector for connecting a windscreen wiper blade assembly to a wiper arm, the connector comprising means for retaining the connector an the assembly and different engaging means for engaging different sizes and/or shapes of wiper arm. The engaging means may comprise a seating surface for engaging a hook type wiper arm and/or differently sized passages for engaging with pin type wiper arms of different sizes, and an optional latching member.

While the foregoing invention has been shown and described with reference to a preferred embodiment, it will be understood by those possessing skill in the art that various changes and modifications may be made without departing from the spirit and scope of the invention.

I claim:

1. A superstructure for a wiper element, comprising:

a primary yoke structure longitudinally extending between two ends, each end of said primary yoke including connection means for connecting said primary yoke structure in pivotal relation to a pair of secondary yoke structures, one of said secondary yoke structures longitudinally and outwardly extending from each of said ends of said primary yoke structure to an outermost end portion;

wiper blade assembly having a backing member and a wiper blade rubber portion extending between two ends;

a claw disposed adjacent each of said outermost end portions of said secondary yoke structures, said claws being connected to said wiper blade assembly; and at least one substantially solid end cap having a first slot, a second slot, and a channel, wherein one of said end portions of one of said secondary yoke structures is at least partially disposed in said first slot wherein said first slot is defined by a recessed portion having an inner peripheral surface continuously circumscribing a portion of said end portion disposed therein, one end of said backing member is at least partially disposed within said second slot, and one end of said wiper blade rubber portion is at least partially disposed within said channel and rests against an end portion of said channel, thereby retaining together said secondary yoke structure said backing member and said wiper blade rubber, said end cap having an inner portion extending around said claw thereby retaining said end cap to said secondary yoke and wiper assembly.

2. A connector for connecting a wiper blade assembly to a wiper arm, said connector comprising:

a body having an upper, a lower and a front portion, said body having a groove extending along said upper and front portions for engaging and supporting a hooked portion of a hooked type wiper arm;

a first passage disposed in a lower portion of said body for rotatably receiving a rod (23) of said wiper blade assembly to facilitate connection therebetween;

a second passage disposed in a lower portion of said body member adjacent said first slot for rotatably receiving a first pin of a first pin type wiper arm adapted to facilitate connection between said connector and said wiper arm;

a third passage disposed in said lower portion of said body adjacent said second passage for rotatably receiving a second pin of a second pin type wiper arm adapted to facilitate connection between said connector and said wiper arm, wherein said first and second passages are of different diameters; and a latching member swingingly secured to said lower portion of said body between an open position and a closed position, wherein when in said closed position said latching member encloses said rod and one of said pins and said hooked portion thereby forming a secure connection between said wiper blade assembly and said wiper arm.

* * * * *